United States Patent [19]
Hirschkorn

[11] Patent Number: 5,851,561
[45] Date of Patent: Dec. 22, 1998

[54] MULTIPLE-EXTRUDER HEAD ASSEMBLY WITH PIVOTAL HEAD PARTS

[75] Inventor: Ingo Hirschkorn, Neu Wulmstorf, Germany

[73] Assignee: Krupp Kunststofftechnik GmbH, Essen, Germany

[21] Appl. No.: 891,651

[22] Filed: Jul. 11, 1997

[30] Foreign Application Priority Data

Jul. 16, 1996 [DE] Germany .................. 196 28 608.5

[51] Int. Cl.⁶ .......................... B29C 47/04; B29C 47/14
[52] U.S. Cl. .................. 425/131.1; 425/183; 425/186; 425/188; 425/190; 425/462
[58] Field of Search .................. 425/131.1, 183, 425/186, 188, 190, 462, 133.5

[56] References Cited

U.S. PATENT DOCUMENTS

| | | | |
|---|---|---|---|
| 4,652,224 | 3/1987 | Golisch | 425/188 |
| 4,693,679 | 9/1987 | Marth . | |
| 4,824,353 | 4/1989 | Hirschkorn . | |
| 4,983,113 | 1/1991 | Hirschkorn | 425/188 |
| 5,061,166 | 10/1991 | Gohlisch et al. | 425/188 |
| 5,242,290 | 9/1993 | Hiraiwa . | |
| 5,332,380 | 7/1994 | Unland . | |
| 5,472,332 | 12/1995 | Gohlisch et al. | 425/188 |
| 5,720,986 | 2/1998 | Gohlisch et al. | 425/188 |

FOREIGN PATENT DOCUMENTS

| | | |
|---|---|---|
| 0270816 | 6/1988 | European Pat. Off. . |
| 3637731 | 5/1988 | Germany . |
| 1100109 | 6/1984 | U.S.S.R. . |

Primary Examiner—Khanh P Nguyen
Attorney, Agent, or Firm—Herbert Dubno; Andrew Wilford

[57] ABSTRACT

An extruder head assembly has a main stationary part adapted to be connected to a plurality of extruders, two head parts pivotal on the main part, and respective actuators associated with the pivotal head parts and having piston rods movable along respective longitudinal axes from the respective pivotal head parts to the stationary part. At least one of the actuators is mounted directly on the respective pivotal head part. Latches including interengaging formations on the stationary part and an outer end of the rod of the one actuator lock the pivotal head parts tightly against the stationary main part.

7 Claims, 3 Drawing Sheets

MULTIPLE-EXTRUDER HEAD ASSEMBLY WITH PIVOTAL HEAD PARTS

FIELD OF THE INVENTION

The present invention relates to an extruder head. More particularly this invention concerns a multiple-extruder head assembly with pivotally mounted head parts.

BACKGROUND OF THE INVENTION

An extruder head is known which is used to make complex parts of different resins. Such a head is connected to a plurality of extruders and has head parts each forming a passage having an upstream end connected to a respective one of the extruders and a downstream end opening at a die. The various resins are forced at very great pressure, often in excess of 500 bar, along the respective passages to merge at the die and form a workpiece of the desired shape.

It is necessary to be able to open up such a head assembly, for servicing and cleaning and for changing the die. Accordingly German patent 3,430,062 of Ehrhardt and U.S. Pat. Nos. 4,824,353 of Hirschkorn, 5,242,290 of Haraiwa, and 5,332,380 of Unland propose systems where the head parts are pivoted on a stationary mold part so that they can be moved between positions where their downstream passage ends merge at the die and positions with their downstream ends separated and the passages exposed.

Such system are all very bulky and difficult to maintain tightly together under the enormous working pressures of the extrusion apparatus. Accordingly hydraulic locks are provided which clamp the head parts to the stationary head part. Such locks normally are constituted as hydraulic cylinders carried on the stationary part and having piston rods that engage formations of the respective head parts to pull same solidly together and against the stationary part.

While these arrangements are relatively effective, they do not completely rule out shifting of the head parts and, therefore, leakage from the extruder head. The cylinders must exert considerable clamping force in order to hold the interfaces between the head parts together.

OBJECTS OF THE INVENTION

It is therefore an object of the present invention to provide an improved extruder head assembly.

Another object is the provision of such an improved extruder head assembly which overcomes the above-given disadvantages, that is which can be counted on to hold together when in use but that can be opened easily when necessary.

SUMMARY OF THE INVENTION

An extruder head assembly has according to the invention a main stationary part adapted to be connected to a plurality of extruders, two head parts pivotal on the main part, and respective actuators associated with the pivotal head parts and having piston rods movable along respective longitudinal axes from the respective pivotal head parts to the stationary part. At least one of the actuators is mounted directly on the respective pivotal head part. Latches including interengaging formations on the stationary part and an outer end of the rod of the one actuator lock the pivotal head parts tightly against the stationary main part.

Due to the mounting of at least one and preferably both of the actuators on the pivotal head parts, it is possible according to the invention for the pivotal head parts to engage the stationary part at respective interfaces and the respective piston rods to extend generally perpendicularly across the respective interfaces.

The rods according to the invention are movable axially and angularly about the respective axes by the respective actuators. The formations include projections on the stationary part forming an opening through which the respective rod outer end can move along the respective axis in one angular position. The rod is rotatable about the respective axis into another angular position in which it can engage axially against the respective projections.

More particularly in accordance with the invention the main part is formed with a recess provided with the projections and the projections have faces engageable with the respective outer end and forming an end of the respective recess. The main part is formed with two such projections.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
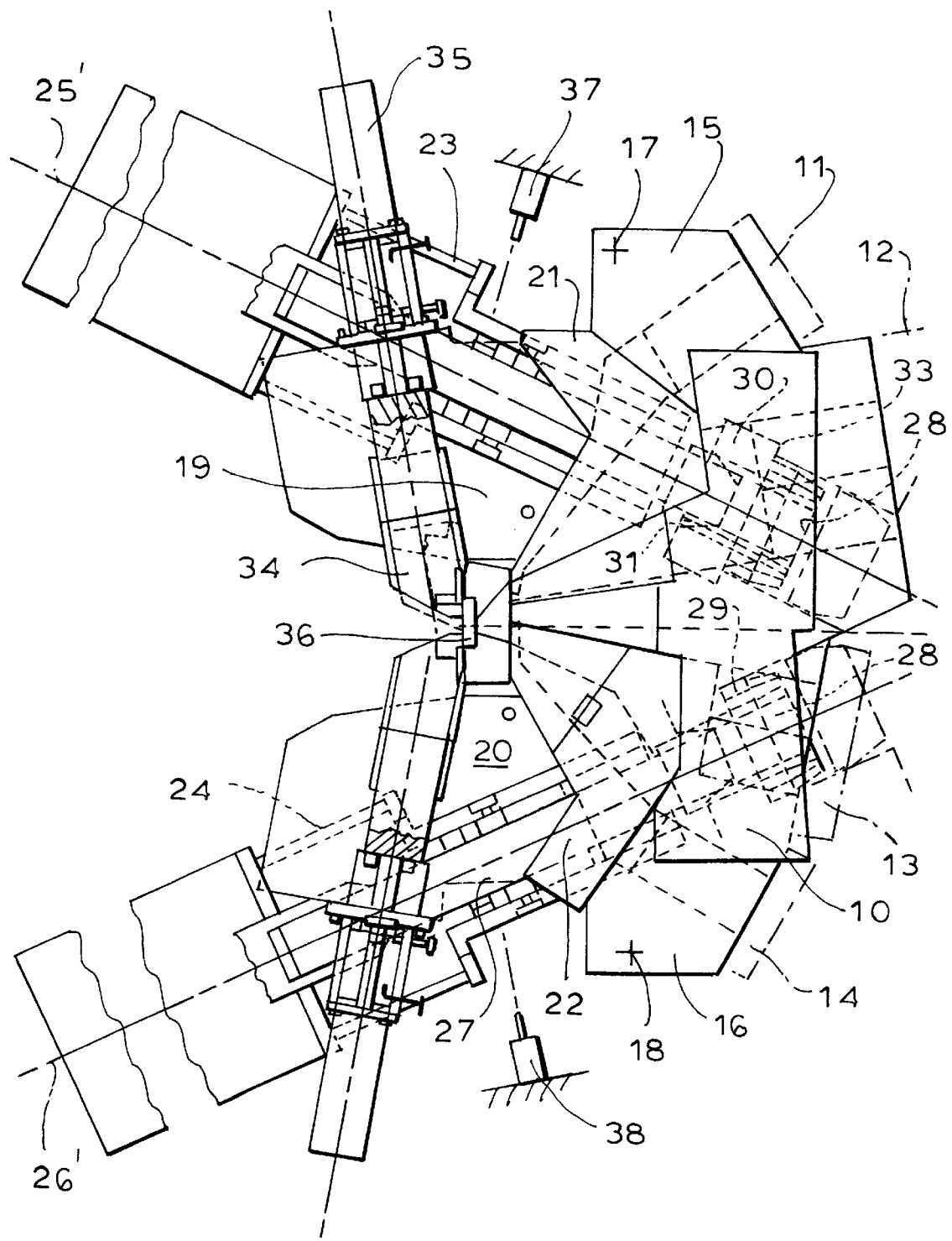
FIG. 1 is a largely diagrammatic view of an extruder-head assembly according to the invention.

As seen in FIG. 1 an extruder head K has a stationary mold part 10 to which are flanged headpieces 11, 12, 13, and 14 of four different extruders. The stationary part 10 is integral with an upper extension 15 and a lower extension 16 forming parallel pivot axes 17 and 18 for upper and lower head parts 19 and 20 as described in above cited U.S. Pat. No. 4,824,353. Respective schematically illustrated cylinders 37 and 38 serve to pivot them about their respective axes 17 and 18. Respective intermediate parts 21 and 22 are engaged between the parts 19 and 20 and the stationary part 10 formed with the extensions 15 and 16.

Respective mounts 23 and 24 carry actuators 25 and 26 on the head parts 19 and 20 that each have a piston rod 27 centered on a respective axis 25' or 26'. The piston rods 27 have outer hammer ends 28 with protuberances or ends 29 projecting transversely of the respective axes 25' and 26' and are engageable in latches 33 on the stationary main part 10. The actuators 25 and 26 are set up so that they can move their piston rods 27 along the respective axes 25' and 26' and rotate them at least limitedly about these axes 25' and 26'

Figure 2:
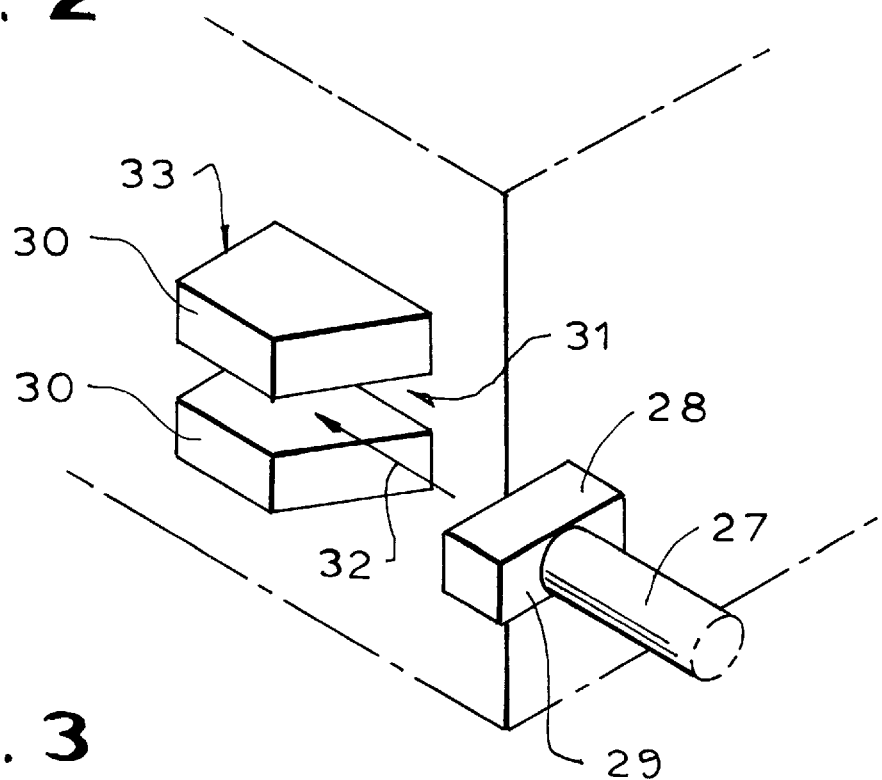
FIGS. 2 and 3 are detail views of the latching arrangement in two different positions.
Figure 3:
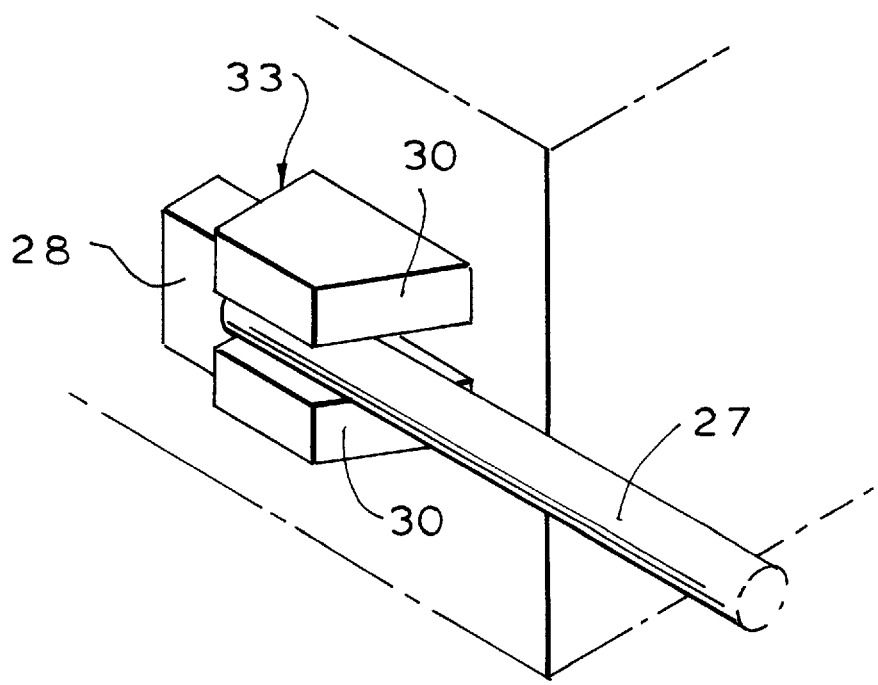

Each such latch 33 comprises as shown in FIG. 2 a pair of lugs 30 defining a slot or gap 31 through which the hammer end 28 can fit in a direction 32 when it is oriented parallel to this slot 31. When rotated through 90°, or through (360/n)° when the rod 27 has n protuberances, the protuberances 29 can be brought into flat contact with the rear surfaces of the lugs 30 to solidly latch and clamp the respective parts 19 and 20 on the part 10. Since the axes 25' and 26' extend roughly perpendicular to the interfaces between the respective parts 19 and 20 and the parts 21 and 22 and between the parts 21 and 22 and the part 10, this system will latch and press these parts very effectively together against the internal pressures urging them apart.

In addition according to this invention each part 19 and 20 carries a retaining wedge 34 that is movable by a respective actuator 35 to hold in place a die plate 36 at the location where the passages from the various extruders 11, 12, 13, and 14 meet.

Figure 4:
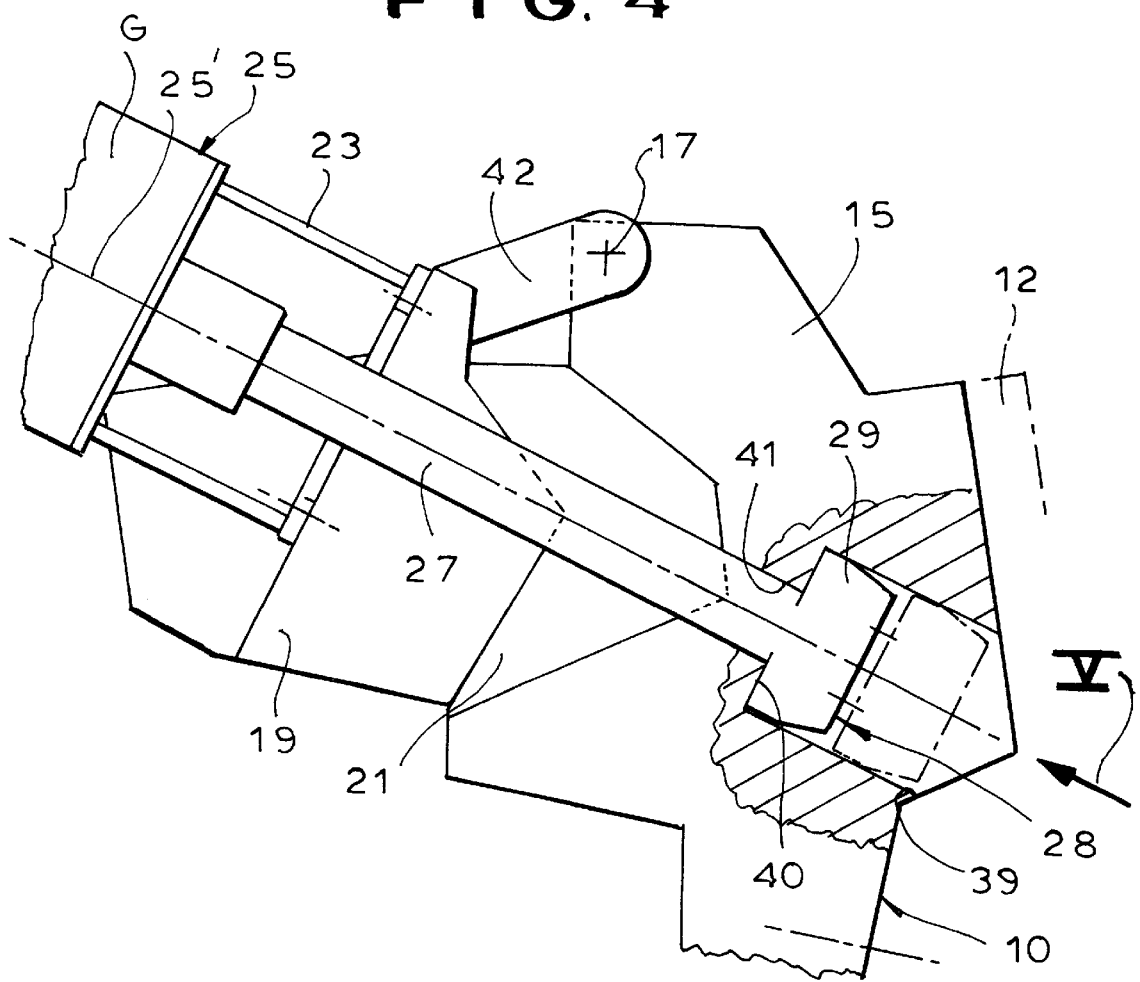
FIG. 4 is a detail view of a variant on the invention.
Figure 5:
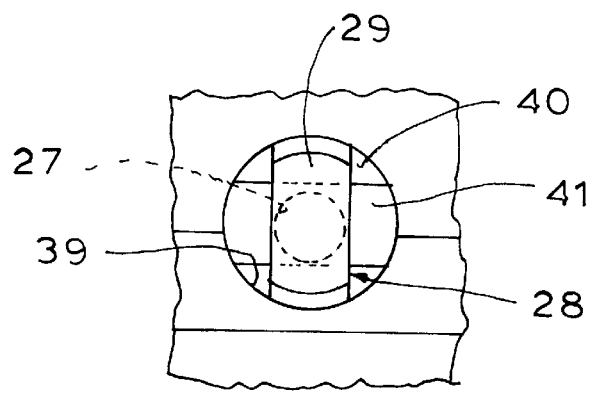
FIG. 5 is an end view taken in the direction of arrow V of FIG. 4.

In the arrangement of FIGS. 4 and 5 the stationary mold part 10 is formed with a cylindrical recess 39 whose axis is coaxial with the axis 25' of the piston rod 27 of the respective actuator 25 when the respective head part 19 is clamped tightly to the part 10. This recess 39 is internally formed with two circle-segment ridges 40 defining a gap 41 through which the hammer head 29 of the rod 27 can pass when aligned parallel to this gap 41.

The head part 19 is mounted via an arm 42 on the pivot axis 17 of the extension 15 so that when the respective actuator 37 presses it flatly against the stationary part 10 the piston rod 27 can be advanced through the slot 41, then rotated through 90° to bring the head 29 into engagement with the back face 40 of the ridges 41 to lock the head part 19 in place, it being understood that the other actuator 26 works identically. Once again the pressure created during molding is effective wholly as tension in the rod 27 so that considerable forces can be withstood.

I claim:

1. An extruder head assembly comprising:

a main stationary part adapted to be connected to a plurality of extruders;

two head parts pivotal on the main part;

respective actuators associated with the pivotal head parts and having piston rods movable along respective longitudinal axes from the respective pivotal head parts to the stationary part, at least one of the actuators being mounted directly on the respective pivotal head part; and latch means including interengaging formations on the stationary part and an outer end of the rod of the one actuator for locking the pivotal head parts tightly against the stationary main part.

2. The extruder head assembly defined in claim 1 wherein the pivotal head parts engage the stationary part at respective interfaces and the respective piston rods extend generally perpendicular across the respective interfaces.

3. The extruder head assembly defined in claim 1 wherein the rods are movable axially and angularly about the respective axes by the respective actuators, the formations including projections on the stationary part forming an opening through which the respective rod outer end can move along the respective axis in one angular position, the rod being rotatable about the respective axis into another angular position in which it can engage axially against the respective projections.

4. The extruder head assembly defined in claim 3 wherein the main part is formed with a recess provided with the projections and the projections have faces engageable with the respective outer end and forming an end of the respective recess.

5. The extruder head assembly defined in claim 3 wherein the main part is formed with two such projections.

6. The extruder head assembly defined in claim 3 wherein the actuators each includes means for displacing the respective piston rods axially and angularly about the respective axes.

7. The extruder head assembly defined in claim 1 wherein both of the actuators are carried on the respective pivotal parts.

* * * * *